(No Model.)

C. BOSS.
REFRIGERATOR.

No. 253,836. Patented Feb. 21, 1882.

Witnesses
S. N. Piper
C. S. Pratt

Inventor
Charles Boss
by R. H. Eddy atty

UNITED STATES PATENT OFFICE.

CHARLES BOSS, OF BATHURST, NEW BRUNSWICK, CANADA.

REFRIGERATOR.

SPECIFICATION forming part of Letters Patent No. 253,836, dated February 21, 1882.

Application filed January 21, 1881. (No model.) Patented in Canada April 11, 1877.

*To all whom it may concern:*

Be it known that I, CHARLES BOSS, of Bathurst, of the county of Gloucester, of the Province of New Brunswick, of the Dominion of Canada, have invented a new and useful Improvement in Refrigerators; and I do hereby declare the same to be described in the following specification and represented in the accompanying drawings, of which—

Figure 1:
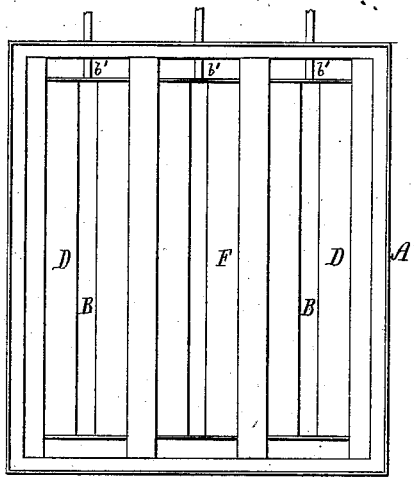
Figure 2:
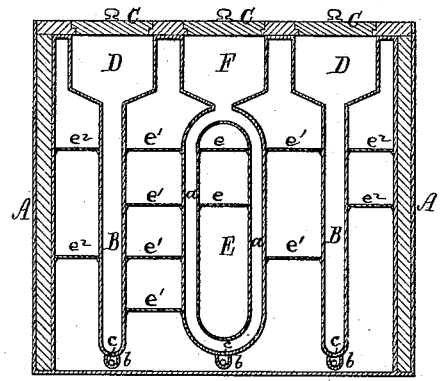

Figure 1 is a top view, and Fig. 2 a transverse vertical section, of a refrigerator provided with my invention, such invention being for the purpose of freezing or keeping cool edible animal or vegetable matters for their preservation, it being specially useful for freezing fish and maintaining meats at a temperature such as will prevent their decay.

The nature of my invention is duly set forth in the claims hereinafter made.

In the accompanying drawings, A denotes a case or chamber having what are termed "double walls," or a space in each of its sides from top to bottom thereof, filled with a heat non-conductor of some suitable kind.

At or near the middle of the chamber A is an upright and elongated chamber, E, surrounded by a narrow ice-receiving space, $a$, which at top opens out of an ice receptacle or hopper, F, arranged as represented, there being at the bottom of the space $a$ an educt, $b$, for the discharge of waste water or matters resulting from the melting of the ice or refrigerating-mixture used in the space $a$. Besides the said refrigerating-chamber E, there is in one or each side of it, and between it and the next adjacent side of the case A, a vertical narrow ice-receiver, B, leading out of a hopper, D, arranged in the upper part of the case A. To the mouth of each hopper there is a closing cover, C, and such ice-receiver B has at its lower part an educt, $b$, for the discharge from it of water or waste matters. There may be in the chamber E shelves or suitable devices for supporting the fish or edible matters to be frozen or kept cool, and there may also be shelves or other suitable devices within the case A to support meats or articles to be kept cool therein.

In using the refrigerator the hoppers D F and the space $a$ and ice-receiver B are to be charged with ice or a suitable refrigerating-mixture, such as ice or ice and salt. The chamber E, being surrounded by such refrigerating material, serves to freeze articles when placed within it, or to maintain them at a much lower temperature than they would be were they placed in the part of the case A which is outside of the chamber E and its surrounding ice-receptacle. Furthermore, the surrounding ice-receptacle of this latter chamber, E, not only serves to cool the air within such chamber, but that in the case A, which is also still further lowered in temperature by means of the ice-receivers B and D.

Experience has demonstrated the valuable advantages of a refrigerator constructed on the plan described, more especially for use on sea-going vessels.

For supporting a fish in the chamber E, I generally employ a tray having a frame to fit to the part of the fish which may be within it. This I use in preference to a flat shelf, which in consequence of the weight of the fish causes the animal, when frozen, to be flat on its lower side, and thus alters its natural form. It is desirable for several reasons to have the fish in its normal shape as near as possible when frozen. The walls of the chamber E are provided with internal and external flanges for supporting the shelves $e\ e'$.

By the construction above described I obtain a refrigerator having compartments of different degrees of coldness, the chamber E, by reason of being surrounded with ice on both sides and top and bottom, being the coldest, while the compartments on each side of the chamber E, not having ice at top and bottom, but only on the sides, are a little less cold, and the outer chambers, having ice on only one side, do not become so cold as either of the other chambers. This arrangement is advantageous, owing to the fact that different articles of food to be properly preserved require different degrees of temperature, as the degree of coldness necessary to preserve some articles would freeze other articles, so as to render them useless.

The ice-receivers $a$ B B are each provided at their lower end with perforations leading to the horizontal channels $b\ b$, which are each supplied with an outlet-pipe, $b'$, through which the water formed by the melting of the ice in the ice-receivers escapes.

What I claim as my invention in the described refrigerator is as follows:

1. In a refrigerator, the double ice-receptacle $a$, surrounding two sides and the top and bottom of the chamber E, in combination with the single ice-receptacles B, and shelves $e\ e'\ e^2$, all arranged substantially as described, whereby chambers of three different degrees of coldness are obtained, as and for the purpose specified.

2. In a refrigerator, the chamber E and the ice-receiver $a$, in combination with a hopper, F, having a contracted lower end, whereby an even thickness of ice or freezing-mixture is maintained entirely around the chamber E, substantially as described.

CHARLES BOSS.

Witnesses:
R. H. EDDY,
E. B. PRATT.